(12) United States Patent
Kuhnt (10) Patent No.: US 10,948,069 B2
(45) Date of Patent: Mar. 16, 2021

(54) HOUSING FOR A TRANSMISSION (71) Applicant: ZF Friedrichshafen AG, Friedrichshafen (DE)

(72) Inventor: Torsten Kuhnt, Diepholz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/895,326

(22) Filed: Jun. 8, 2020

(65) Prior Publication Data
US 2020/0300352 A1 Sep. 24, 2020

Related U.S. Application Data (63) Continuation of application No. 15/521,355, filed as application No. PCT/EP2015/072901 on Oct. 5, 2015, now Pat. No. 10,677,341.

(30) Foreign Application Priority Data

Nov. 10, 2014 (DE) ........................ 10 2014 222 895

(51) Int. Cl.
*F16H 57/03* (2012.01)
*B62D 5/04* (2006.01)
*F16H 57/02* (2012.01)
*F16H 25/20* (2006.01)

(52) U.S. Cl.
CPC ........... *F16H 57/03* (2013.01); *B62D 5/0424* (2013.01); *F16H 2025/2031* (2013.01); *F16H 2057/02039* (2013.01); *F16H 2057/02043* (2013.01); *F16H 2057/02091* (2013.01)

(58) Field of Classification Search
CPC .. F16H 57/03; F16H 57/0416; F16H 57/0415; F16H 57/0412; F16H 2025/2031; F16H 2025/2034
See application file for complete search history.

(56) References Cited

U.S. PATENT DOCUMENTS

| 5,245,891 | A | 9/1993 | Marich et al. |
| 5,287,770 | A | 2/1994 | Mudd |
| 7,066,041 | B2 * | 6/2006 | Nielsen ............... A47C 20/041 74/425 |
| 9,073,402 | B2 | 7/2015 | Elbers et al. |
| 9,528,580 | B2 | 12/2016 | Wu |

(Continued)

FOREIGN PATENT DOCUMENTS

| CN | 203 770 598 U | 8/2014 |
| DE | 38 17 335 A1 | 11/1989 |

(Continued)

OTHER PUBLICATIONS

Machine Translation of WO 2015/162952, obtained Nov. 20, 2020.*
German Search Report Corresponding to 10 2014 222 895.6 dated Sep. 24, 2015.

*Primary Examiner* — Richard W Ridley
*Assistant Examiner* — Brian J McGovern
(74) *Attorney, Agent, or Firm* — Davis & Bujold PLLC; Michael J. Bujold (57) ABSTRACT

A housing for a transmission, in particular an actuator housing. The housing having a housing wall and ribs that protrude from the housing wall to the outside and/or inside. The protruding ribs are at least partially arranged such that they form a honeycomb-shaped structure on the housing wall.

12 Claims, 5 Drawing Sheets

(56) References Cited

U.S. PATENT DOCUMENTS

| | | | |
|---|---|---|---|
| 2005/0133194 A1* | 6/2005 | Lan | F16H 57/0415 |
| | | | 165/41 |
| 2006/0090591 A1 | 5/2006 | Graeve | |
| 2008/0079225 A1 | 4/2008 | Choi et al. | |
| 2009/0293655 A1* | 12/2009 | Tseng | F16H 25/2015 |
| | | | 74/89.37 |
| 2014/0196555 A1* | 7/2014 | Wu | F16H 25/20 |
| | | | 74/89.23 |
| 2014/0356583 A1 | 12/2014 | Sanders et al. | |
| 2015/0326088 A1 | 11/2015 | Funada | |

FOREIGN PATENT DOCUMENTS

| | | | |
|---|---|---|---|
| DE | 10 2011 082 768 A1 | 3/2013 | |
| DE | 20 2014 100 633 U1 | 4/2014 | |
| DE | 10 2013 007 700 A1 | 11/2014 | |
| JP | H04-113062 A | 4/1992 | |
| JP | 2002-005270 A | 1/2002 | |
| JP | 2008-025768 A | 2/2008 | |
| WO | 2004/104450 A1 | 12/2004 | |
| WO | 2014/112602 A1 | 7/2014 | |
| WO | WO-2015162952 A1 * | 10/2015 | B62D 3/12 |

* cited by examiner

HOUSING FOR A TRANSMISSION

This application is a continuation of U.S. application Ser. No. 15/521,355, now U.S. Pat. No. 10,677,341 issued Jun. 9, 2020, which is a National Stage completion of PCT/EP2015/072901 filed Oct. 5, 2015, which claims priority from German patent application serial no. 10 2014 222 895.6 filed Nov. 10, 2014.

FIELD OF THE INVENTION

The invention relates to a housing for a transmission, in particular an actuator housing, comprising a housing wall, wherein ribs protrude from the housing wall to the outside and/or inside. The invention also relates to the use of a housing for a length-adjustable chassis actuator or for a chassis actuator with a linearly displaceable push rod or threaded spindle, as well as a chassis using a chassis actuator.

BACKGROUND OF THE INVENTION

From the prior art, housings for transmissions or special steering gear housings are known which, in order to improve the housing stiffness or to permit better heat dissipation, do not have a smooth-walled housing but rather a housing with ribs protruding from the housing wall. Such a steering gear is described for example in DE 38 17 335 A1.

SUMMARY OF THE INVENTION

For weight reasons on the one hand and for cost reasons on the other hand, only as much material as necessary should be used for the housing. The invention therefore addresses the problem of designing an improved housing in such a way that a housing can be created which has a lightweight construction and which can be mass produced in a cost-effective manner.

The problem is solved by means of the independent claims. Advantageous further developments will emerge from the dependent claims.

The housing for a transmission, in particular for an actuator, in other words, an actuator housing, comprises a housing wall, wherein ribs protrude from this housing wall to the outside and/or inside. The housing is distinguished in that the protruding ribs are at least partially arranged distributed over the housing wall in such a way that the ribs form a honeycomb-shaped structure on the housing wall. In other words, the housing wall is at least partially covered with honeycombs, in particular over at least ¾ of the housing surface, or has a honeycomb structure on % of its surface. The housing can also be completely covered with the honeycomb structure. Each honeycomb is enclosed by six ribs or formed by said ribs, with two ribs in each case creating an angle of 120 degrees and two of the six ribs in each case being arranged opposite and parallel, with the ribs transitioning into one another smoothly, so that a uniform honeycomb structure is produced and the honeycombs are formed at their corners by hyperbolic rounding.

The housing can be formed in one piece, but it can also be formed in multiple pieces, preferably two pieces. In one preferred two-piece embodiment, one piece can form the housing and another piece can form a housing cover. In another embodiment, the housing can be formed in two pieces, with a first piece forming a housing top section and another piece forming the housing bottom section. The division can extend in the direction of the longitudinal axis or preferably transverse thereto. The housing cover is preferably formed smaller relative to the housing so that the housing cover has fewer honeycombs. Together, the at least two mentioned parts form the whole housing.

The uniform arrangement of the honeycomb-shaped structure on the housing wall provides the advantage of a very strong housing construction. The reinforcing honeycomb-shaped structure of the ribs makes it possible for the material thickness of the housing wall itself to be reduced compared with a housing without a honeycomb structure that covers large parts of the housing surface. The honeycomb-shaped structure also advantageously creates a larger surface, which provides better heat dissipation compared with individual ribs known from the prior art with a generally smooth-walled housing surface.

The honeycombs of the honeycomb-shaped structure are arranged consecutively in the longitudinal direction of the housing. The honeycombs are formed hexagonal, i.e., in the form of a six-sided figure, and uniformly distributed over the housing wall in the hexagonal formation. As already stated above, this means that the honeycombs are formed as uniform six-sided figures. In a hexagonal formation the honeycombs are each uniformly spaced apart from one another and arranged offset relative to one another. The edges of the adjoining honeycombs are parallel to one another. The spacing between the honeycombs is uniform in the hexagonal formation, so that the center points of the adjacent honeycombs have the same spacing relative to one another.

In the housing according to the invention, the symmetry axes of the honeycombs arranged on the housing wall extend parallel to one another and/or extend perpendicular to the longitudinal axis of the housing wall. The honeycombs have an identical or uniform depth thanks to the ribs which protrude to the same height from the housing wall. The symmetry axis in this context refers to the axis which extends through the center point of the honeycomb or of the six-sided figure and projects out of the honeycomb.

The symmetry axes of the honeycombs arranged on the housing wall preferably extend perpendicular to a plane extending parallel to the longitudinal axis, in particular extending through the longitudinal axis of the housing. For a smooth-walled housing, in other words, a housing which is not tubular, cylindrical, conical or tapered or a housing wall presenting no curved surfaces, this means that the honeycombs of the honeycomb-shaped structure are formed as hexagonal cylinders arranged parallel to one another. In other words, the honeycombs stand virtually vertical on the flat housing wall. With a view to the producibility of a housing, which is produced by means of die casting, in particular from the material aluminum or from an aluminum alloy or from magnesium or a magnesium alloy, the demoldability of the housing relative to the die casting mold must be considered and thus ensured. This factor must be considered in particular with regard to a cost-effective die casting mold when the mold preferably dispenses with a slide or a similar device.

When the housing wall of the housing is formed not flat but rather tubular, cylindrical, approximately cylindrical, conical or tapered, in particular with respect to the longitudinal axis or around same, care must be taken to ensure that, for the sake of demoldability, the symmetry axes, and thus the honeycombs too, are correspondingly formed. In other words, the honeycombs or their symmetry axes cannot therefore be arranged vertically on such a housing wall because otherwise the demoldability relative to the die casting mold is not ensured. The honeycombs arranged on the housing wall preferably extend perpendicular to a plane extending parallel to the longitudinal axis, in particular through the longitudinal axis of the housing. The symmetry axes of the honeycombs are arranged perpendicular to this imaginary plane.

It shall be understood that, in the afore-mentioned housing types, the longitudinal axis can be the same as the symmetry axis of the housing. In that case, the plane extending through the longitudinal axis can constitute a symmetry plane for the housing when the symmetry plane splits the housing centrally.

Each rib preferably has approximately the same width, preferably exactly the same width, and/or each rib starting from the housing wall has approximately the same height. Each rib preferably has exactly the same height, most preferably a height of approximately 4 mm, preferably exactly 4 mm. A housing wall laid over the surface of the ribs would thus produce a housing wall parallel to the actually existing housing wall, and these walls would have a spacing from one another of 4 mm.

As already stated above, the ribs each transition into one another smoothly, in other words, with a rounding, with the transition preferably being formed with a radius of approximately, preferably exactly, 3 degrees. The hexagonal honeycombs are thus each formed by three pairs of angles or roundings lying opposite one another.

The ribs lying opposite one another in each honeycomb have an approximately identical, preferably exactly identical spacing relative to one another. The spacing of the inner edges of the honeycombs is preferably approximately 11 mm, most preferably exactly 11 mm. It has surprisingly been found that the above-mentioned parameters allow a surface structure or housing structure to be produced which is on the one hand very solid and which is also very satisfactory with regards to heat dissipation.

To further enhance the housing solidity, it is also possible to provide longitudinal ribs extending parallel to the longitudinal axis of the housing. These longitudinal ribs can preferably have a greater height starting from the housing wall than the ribs forming the honeycomb structure. Depending on the stress, the longitudinal ribs may be required on the housing because they are very well suited to absorbing forces in the main direction of stress.

As already stated above, the housing is preferably produced by aluminum or magnesium die casting or by a plastic injection molding process. In particular when plastic injection molding is employed, a more pronounced formation of the honeycomb structure or honeycomb forms is to be expected due to the material properties of plastic compared with aluminum or magnesium die casting. This is because aluminum and magnesium shrink to a greater extent when cooled compared with the plastic used in plastic injection molding. The structure or the edges thereof can be more pronounced.

It shall be understood that the parameters known and standardized in die casting or plastic injection molding such as drafts are used in the formation of the above-mentioned housing.

A housing according to the use with the above-mentioned embodiments is advantageously used for a length-adjustable chassis actuator or for a chassis actuator with a linearly displaceable push rod or threaded spindle. Such a chassis actuator, which can be used for the indirect or direct activation of a wheel carrier, must have a high level of overall stiffness. This is necessary in order to absorb the forces applied via the wheel to the wheel carrier or to withstand them.

The above-mentioned chassis actuator can advantageously be used in a chassis, wherein a chassis actuator is used in each case for the track and/or camber adjustment for each wheel of the chassis or at least one chassis actuator is used for at least one axis of a chassis.

The above-mentioned chassis actuator has an electric or hydraulic or combined drive system and can have a transmission with a spindle nut acting on a spindle. The spindle can be formed as a recirculating ball screw or preferably as a self-locking spindle, in particular as a trapezoidal spindle. The spindle can be formed in one piece or in multiple pieces. The actuator preferably has a linear sensor, which can detect the displacement of the spindle relative to the housing.

BRIEF DESCRIPTION OF THE DRAWINGS

The invention is described below on the basis of preferred embodiments with reference to the drawings, in which.

DETAILED DESCRIPTION OF THE PREFERRED EMBODIMENTS

Figure 1:
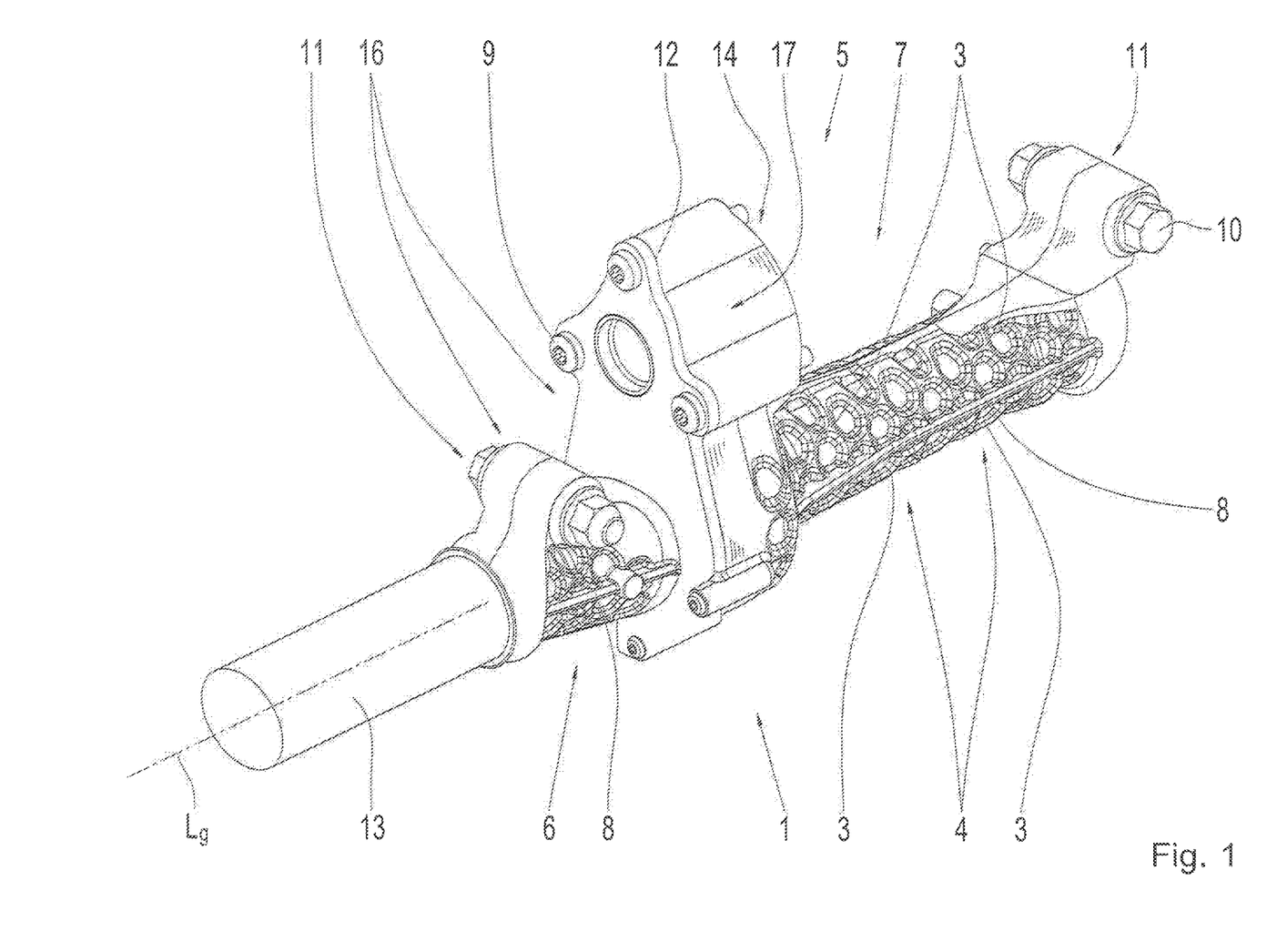
FIG. 1 shows a perspective depiction of a housing or of an actuator.

FIG. 1 shows a perspective depiction of a two-piece housing 1, which can be used for an actuator 5, for example in a displaceable or length-adjustable rod for the displacement of a wheel carrier or several wheel carriers in the chassis of a motor vehicle.

The housing 1 is formed by a first housing part 7 situated on the right or at the rear when viewed in the drawing, which is connected to a front or left additional housing part 6. A joint or dividing line 12 can be seen in the drawing, with an imaginary plane extending through the joint which serves as a connecting plane between the housing part 6 and the housing part 7. The two housing parts 6, 7 are connected to one another in a form-fitting manner by means of several screws 9. For the purpose of attaching the housing 6, 7 or the actuator 5 to a chassis or to the body, several screw attachment points or eyes 11 are arranged on the housing parts 6 or 7. A threaded spindle 13 extends through the complete or assembled housing 1, which threaded spindle extends parallel to the longitudinal axis $L_g$ of the housing 1. An electric motor (not depicted) can be flange-mounted on a screw attachment surface 14 of the housing part 7, which electric motor is able to displace or to shift the spindle 13 relative to the housing 1 linearly along the longitudinal axis $L_g$ by means of a toothed belt or V-ribbed belt or a gear train or wave train and a spindle nut. If the housing 1 is connected by means of the screw attachment points 11 to a vehicle axle of a vehicle for example, and the end of the spindle 13 is connected to a fork, which engages with a steering lever of a wheel carrier for example, the linear displacement of the spindle permits a track or camber adjustment of the wheel carrier or of the wheel of the vehicle rotatably mounted thereon.

Figure 2:
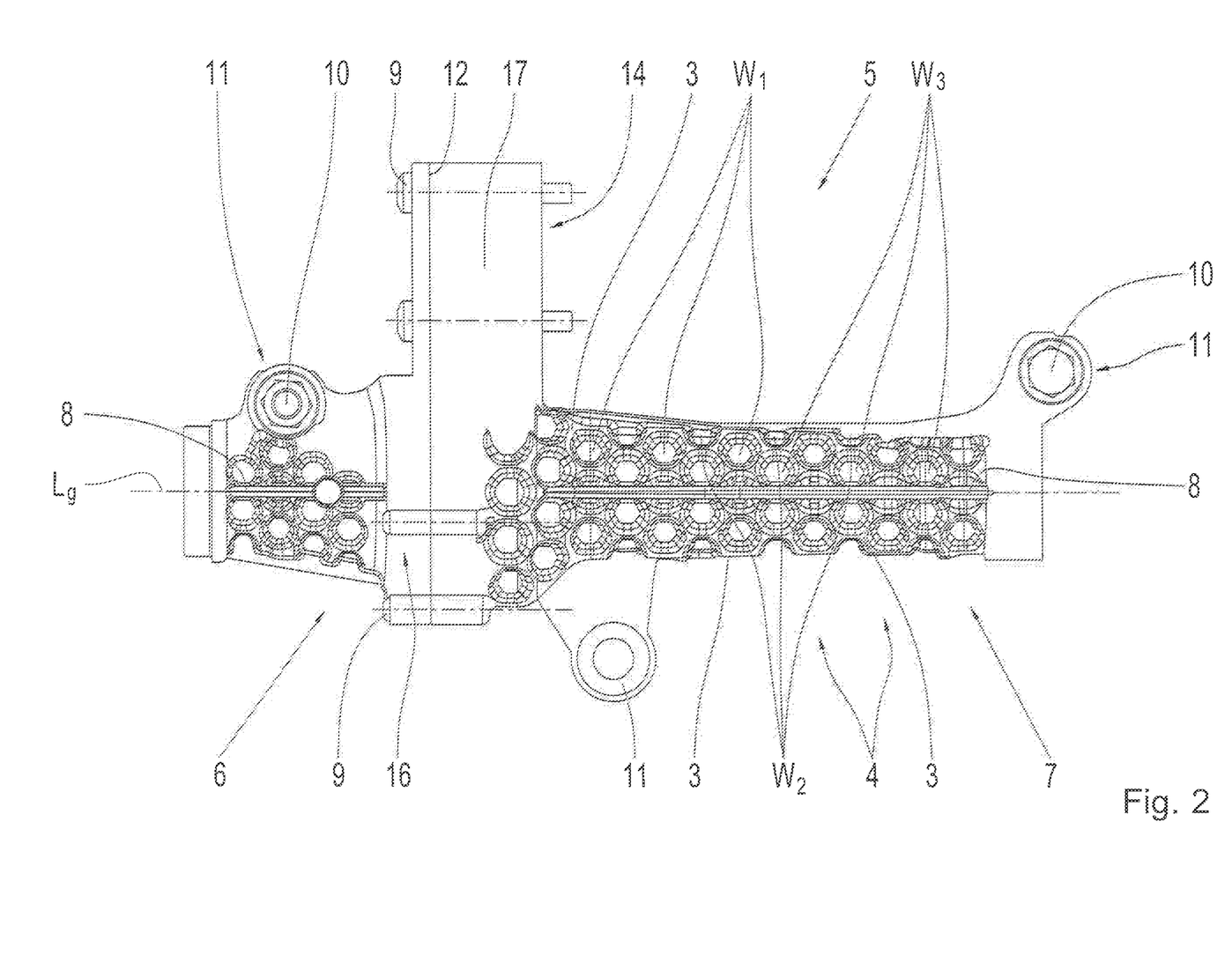
FIG. 2 shows a depiction of a housing or actuator according to FIG. 1 in a side view.

FIG. 2 provides essentially the same features, said FIG. 2 is a side view of the perspective depiction of the housing 1 according to FIG. 1. In addition to the housing in FIG. 1, the rear housing part 7 has an additional third screw attachment point or an eye 11. Both figures will be seen to show a smooth-walled housing region 17 in particular in the region of the screw attachment surface 14 provided for the not depicted electric motor. The front housing part 6 likewise has regions formed as a smooth-walled housing region 16. If the longitudinal regions of the housing parts 6 and 7 which actually pertain to the housing and which are formed slightly conical are viewed either in FIG. 1 or in FIG. 2, it is evident that, in almost all of the longitudinal direction, the housing is not represented with smooth walls, but rather with a honeycomb structure 4. In other words, the honeycomb structure is formed on the smooth-walled structure. The honeycombs $W_1$, $W_2$ and $W_3$ extend parallel to the longitudinal axis $L_g$ when viewed in the longitudinal direction. The honeycombs are formed as six-sided figures and extend in a hexagonal formation. The honeycombs are produced by arranging ribs or bars 3 on the housing wall 18, thus forming the honeycomb structure 4.

As is customary in a honeycomb structure, the honeycombs have the same spacing relative to one another, so that the center points of the honeycombs have the same spacing relative to one another. For this purpose, the bars or ribs 3 have the same wall thickness or wall width and have a uniform height relative to the housing wall from which the bars or ribs 3 protrude. Further detailed information about the nature of the honeycombs $W_{1,2,3}$ and the bars or ribs 3 and their arrangement on the housing 1 is provided in FIG. 3. The depicted honeycomb-shaped structure makes it possible to construct the housing as a whole with relatively thin walls. The depicted housing is produced by means of aluminum die casting and the honeycomb structure permits a much larger housing surface than in the case of a purely smooth-walled housing surface. This results in a very good heat dissipation to the surrounding environment. In order to obtain a particularly high level of stiffness in the main direction of stress extending in the longitudinal direction, a longitudinal rib 8 extending parallel to the longitudinal axis $L_g$ is formed on the housing part 6 and on the housing part 7. It can be seen from FIG. 1 that the longitudinal rib 8 protrudes further from the housing wall or is higher than the ribs or bars 3. The height of the longitudinal rib 8 was determined according to the calculated stress.

Figure 3:
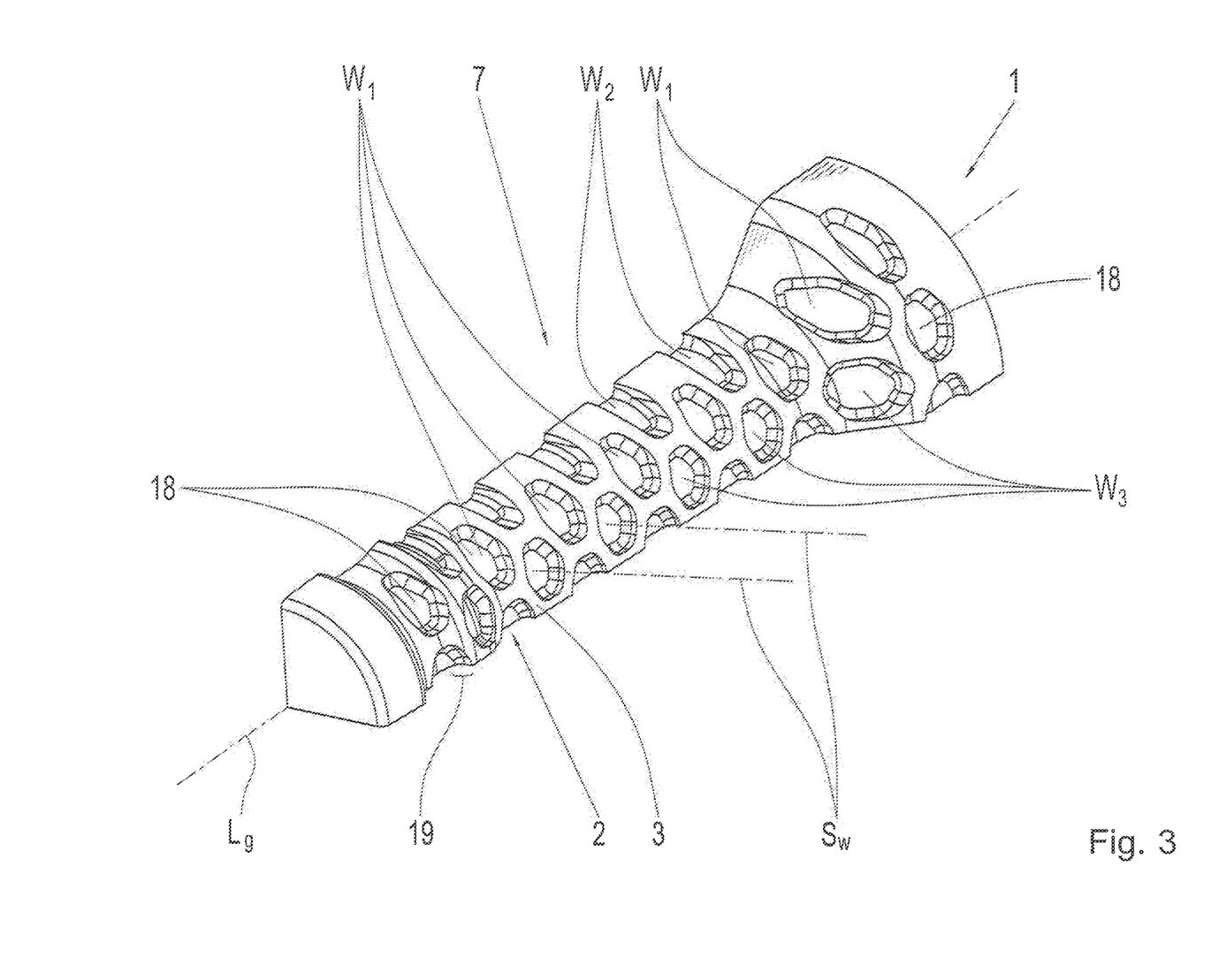
FIG. 3 shows a perspective partial view of a housing or a housing part.

FIG. 3 shows a segmented section of the rear housing part 7 of the housing 1. It can be clearly seen from the magnified depiction that the ribs or bars 3 have a uniform height and width. It can also be clearly seen that the honeycombs form a honeycomb structure composed of a hexagonal formation. The honeycombs $W_1$ lie in a consecutive arrangement in the longitudinal direction. That is also the case for the honeycombs $W_2$ and $W_3$. It can be seen that the honeycombs $W_2$ and $W_3$ likewise lie next to one another when viewed in the longitudinal direction. The honeycombs $W_1$ lie offset relative to the honeycombs $W_2$ and $W_3$. This arrangement thus produces a hexagonal formation or the honeycomb structure as described above. On the segment section of the housing part 7 it can also be seen that the honeycombs each have a base 18 which is coextensive with the housing wall 18. In other words, the honeycombs begin on the housing wall 18. It can be seen that the housing wall 18 is formed tubular in the form of a cylindrical external skin or a conical cylindrical external skin relative to the longitudinal axis Lg. The bars or the ribs 3 protrude from the housing wall 18 and all have a uniform height. An imaginary wall extending over the external extension of the ribs extends with the distance of the height of the ribs or bars 3 from the housing wall 18 such that it would form a concentric outer housing wall. It can be seen that the bars or ribs 3 do not protrude at a 90 degree angle from the housing wall. This is due to the fact that drafts must be provided for casting reasons or with respect to the demoldability of the housing which is produced by aluminum die casting. For the housing depicted here, drafts of approximately 3 degrees are provided in order to ensure demoldability from the aluminum die casting mold. The demoldability is also the reason why the symmetry axes of the respective honeycombs do not project vertically from the cylindrical and/or conically formed housing wall 18. The symmetry axes $S_W$ of each honeycomb extend parallel to one another and extend at right angles from an imaginary plane $E_L$, which extends through the longitudinal axis Lg. This can be seen in particular from FIG. 5, which provides a similar depiction to FIG. 3.

Figure 5:
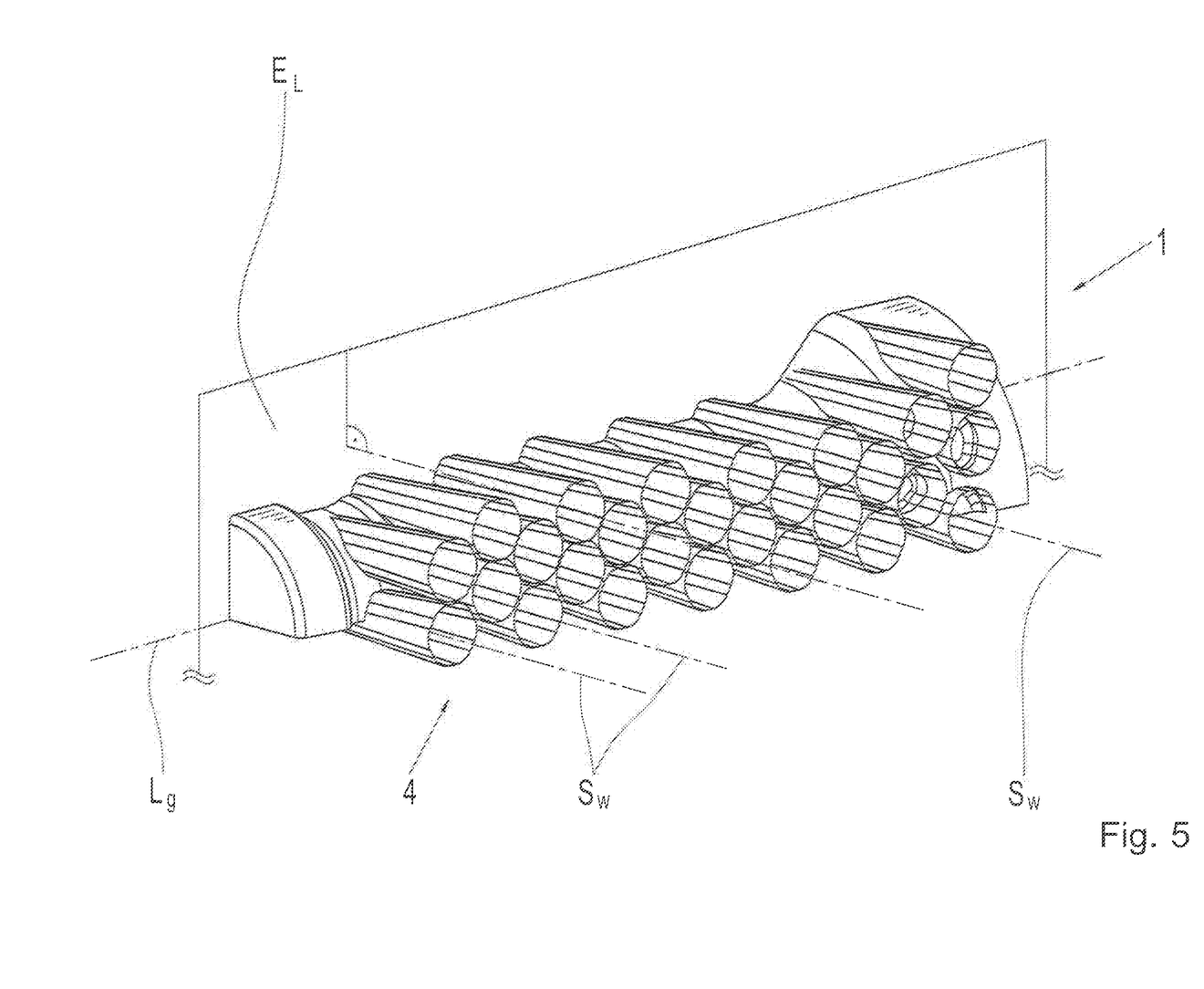
FIG. 5 shows another perspective depiction of a housing part according to FIG. 3 for the purpose of representation of the honeycomb structure.

FIG. 5 also shows the housing segment according to FIG. 3, wherein the honeycombs extend starting from a plane which is not depicted in greater detail, which extends parallel to the plane $E_L$, wherein the honeycombs are projected starting from this imaginary plane as honeycomb-shaped cylinders on the housing wall 18 or the surface of the housing part 7. It can be seen that this type of projection allows the presentation of a honeycomb structure on the housing wall 18 as depicted in FIG. 3 or in FIGS. 1 and 2.

Figure 4:
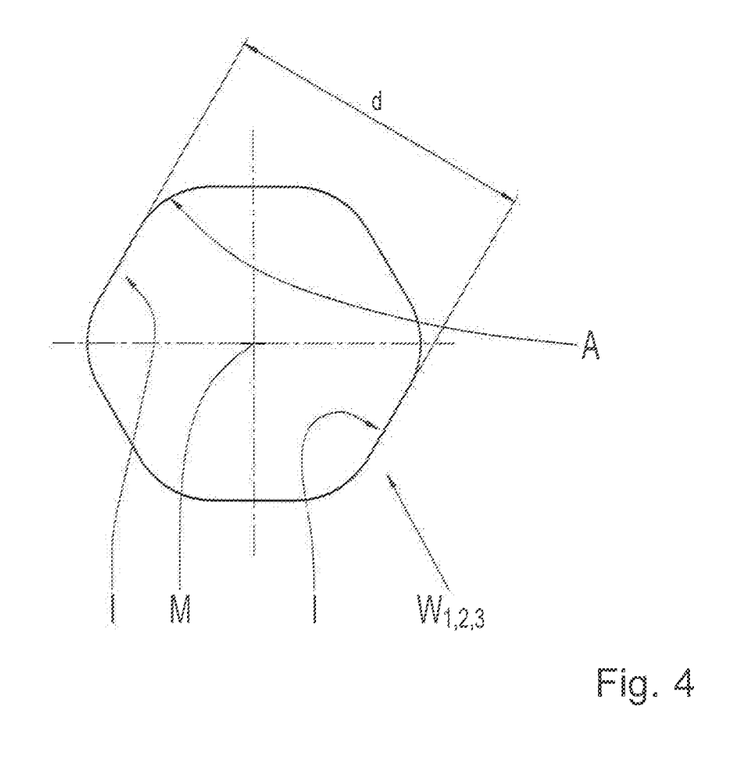
FIG. 4 shows a schematic view of a honeycomb used on the housing wall of the housing according to FIG. 1, 2 or 3.

FIG. 4 is a schematic depiction of a honeycomb $W_{1,2,3}$ and shows the internal diameter d, relative to the inner edges I which extend parallel to one another. It can be clearly seen that the inner edges do not run towards each other such that they would form a corner with an obtuse angle. The inner edges transition into one another with a rounding, with the roundings transitioning into one another with a radius of 3 mm starting from the center point M of the honeycombs $W_{1,2,3}$.

It shall be understood that the above-mentioned features of the invention can be used not only in the stated combinations, but also in other combinations or alone, without exceeding the scope of the invention. A mechanical reversal of the functions of the individual mechanical elements of the invention is also within the scope of the invention.

REFERENCE NUMERALS LIST 1 housing
2 honeycomb
3 rib, bar
4 honeycomb structure
5 actuator
6 housing part, cover
7 housing part
8 longitudinal rib
9 screw
10 screw
11 screw attachment point, eye
12 joint, dividing line
13 spindle
14 screw attachment surface
16 smooth-walled housing part/region
17 smooth-walled housing part/region
18 honeycomb base, housing wall
19 drafts
$E_L$ plane (along longitudinal axis)
$L_g$ longitudinal axis housing
$S_W$ symmetry axis honeycomb
$W_1$ honeycomb
$W_2$ honeycomb
$W_3$ honeycomb A rounding honeycomb
I inner edge honeycomb
M center point honeycomb
d spacing inner edges honeycomb

The invention claimed is:

1. A housing for an actuator, the housing comprising:
    a tubular housing wall which defines a longitudinal axis of the housing;
    a plurality of ribs protruding radially outward from the tubular housing wall, and the plurality of ribs forming a plurality of hexagonally shaped honeycombs;
    a threaded spindle disposed within the tubular housing wall, and the threaded spindle is coaxially aligned with the longitudinal axis and linearly displaceable relative to the housing; and
    each of opposed axial ends of the housing includes a respective screw attachment eye extending radially outward from the housing.

2. The housing according to claim 1, wherein the plurality of hexagonally shaped honeycombs are consecutively arranged along the longitudinal axis of the housing.

3. The housing according to claim 1, wherein the plurality of hexagonally shaped honeycombs are uniformly distributed on the tubular housing wall.

4. The housing according to claim 1, wherein each of the plurality of hexagonally shaped honeycombs defines a respective symmetry axis thereof.

5. The housing according to claim 4, wherein the respective symmetry axes extend perpendicular relative to the longitudinal axis of the housing, and the respective symmetry axes are parallel to each other.

6. The housing according to claim 4, wherein the respective symmetry axes are perpendicular to a plane that extends along the longitudinal axis of the housing such that the longitudinal axis lies within the plane.

7. The housing according to claim 1, wherein each of the plurality ribs extends radially outward from the tubular housing wall by a same radial height such that a radially outermost surface, formed by the plurality of ribs, is concentric with the tubular housing wall.

8. The housing according to claim 1, wherein oppositely disposed ribs within the plurality of ribs have at least one of:
    an approximately identical spacing relative to one another,
    an identical spacing relative to one another,
    a spacing of inner edges that is approximately 11 mm, and
    a spacing of the inner edges that is exactly 11 mm.

9. The housing according to claim 1, wherein the tubular housing wall has longitudinal ribs protruding therefrom, the longitudinal ribs extend axially along the tubular housing wall parallel to the longitudinal axis of the housing, and, relative to the tubular housing wall, the longitudinal ribs have a greater radial height than a radial height of the plurality of ribs forming the plurality of hexagonally shaped honeycombs.

10. The housing according to claim 1, wherein the housing is produced by one of an aluminum die casting process, a magnesium die casting process and a plastic injection molding process.

11. The housing according to claim 1, wherein the respective screw attachment eyes are configured to attach the housing to a chassis or a body of a vehicle.

12. A housing for an actuator, the housing comprising:
    a tubular housing wall which defines a longitudinal axis of the housing;
    a plurality of ribs that laterally protrude from the tubular housing wall and form a plurality of hexagonally shaped honeycombs, and each of the plurality of hexagonally shaped honeycombs defines a respective honeycomb symmetry axis;
    the plurality of ribs extend from the tubular housing wall such that the plurality of hexagonally shaped honeycombs extend perpendicularly relative to the longitudinal axis of the housing, and the respective honeycomb symmetry axes are parallel to each other;
    from lateral points of view perpendicular to the longitudinal axis, each of the plurality of hexagonally shaped honeycombs is symmetric about the respective honeycomb symmetry axis thereof; and
    each of the plurality of ribs transitions into another one of the plurality of ribs with a rounding of a radius of 3°.

* * * * *